US005444905A

United States Patent [19]

St. Clair

[11] Patent Number: 5,444,905

[45] Date of Patent: Aug. 29, 1995

[54] APPARATUS FOR MANUFACTURING MATTRESSES AND BOX SPRINGS

[75] Inventor: Albert R. St. Clair, Lilburn, Ga.

[73] Assignee: Simmons Company, Atlanta, Ga.

[21] Appl. No.: 212,235

[22] Filed: Mar. 14, 1994

[51] Int. Cl.[6] .......... B23P 21/00; B21F 3/06

[52] U.S. Cl. .......... 29/564.7; 29/33 F; 72/131; 72/138; 140/3 CA

[58] Field of Search .......... 29/33 R, 173, 34 D, 29/33 F, 564.7, 564.8, 564.1; 140/103, 3 CA, 102, 105; 72/138, 131, 132, 140

[56] References Cited

U.S. PATENT DOCUMENTS

| | | | |
|---|---|---|---|
| 3,740,984 | 6/1973 | Bergevin | 72/30 |
| 4,030,327 | 6/1977 | Collins et al. | 72/140 X |
| 4,173,135 | 11/1979 | Lamperti | 72/131 X |
| 4,234,983 | 11/1980 | Stumpf . | |
| 4,245,362 | 1/1981 | Mueller . | |
| 4,393,678 | 7/1983 | Favot et al. | 72/131 |
| 4,399,573 | 8/1983 | Barigh t. | |
| 4,406,391 | 9/1983 | St. Clair . | |
| 4,439,977 | 4/1984 | Stumpf . | |
| 4,451,946 | 6/1984 | Stumpf . | |
| 4,491,491 | 1/1985 | Stumpf . | |
| 4,528,831 | 7/1985 | Russell et al. | 72/131 |
| 4,565,046 | 1/1986 | Stumpf . | |
| 4,566,926 | 1/1986 | Stumpf . | |
| 4,578,834 | 4/1986 | Stumpf . | |
| 4,779,438 | 10/1988 | Frei | 72/132 X |
| 4,854,023 | 8/1989 | Stumpf | 29/91 |
| 4,934,165 | 6/1990 | Philpot | 72/138 X |
| 4,938,046 | 7/1990 | Kodama et al. | 29/173 X |
| 4,986,518 | 1/1991 | Stumpf . | |
| 5,182,930 | 2/1993 | Matsuoka | 29/173 |
| 5,186,435 | 2/1993 | Smith . | |

FOREIGN PATENT DOCUMENTS

| | | | |
|---|---|---|---|
| 958967 | 12/1974 | Canada | 140/3 CA |
| 3165942 | 7/1991 | Japan | 140/103 |
| 3285729 | 12/1991 | Japan | 140/103 |
| 471228 | 8/1937 | United Kingdom | 72/138 |
| 4018116 | 8/1994 | WIPO | 29/564.1 |

*Primary Examiner*—William Briggs
*Attorney, Agent, or Firm*—Jones, Day, Reavis & Pogue

[57] ABSTRACT

An apparatus for forming springs for incorporation into an innerspring mattress is disclosed. The apparatus includes the use of change gears to facilitate the manufacture of a variety of innerspring sizes.

19 Claims, 11 Drawing Sheets

| | | | | |
|---|---|---|---|---|
| | JACKSHAFT NUMBERS | | | |
| | | | | |
| FIXED PRIOR ART COILER HEAD PRODUCES (I) COIL FOR EACH | | | | |
| 3,000 REVOLUTIONS OF THE INPUT SHAFT | | | | |
| | | | | |
| BASE RATIO | J'SHFT GEARS | J'SHFT RATIO | TOTAL RATIO | COIL INFORMATION |
| PINION/BULL GEAR | DRIVER-DRIVEN | | | |
| | | | | |
| 3.0/1 | 50T 70T | 1.4/1 | 4.20/1 | EXTRA LARGE COILS |
| | | | | |
| 3.0/1 | 55T 65T | 1.1818/1 | 3.5455/1 | |
| | | | | |
| 3.0/1 | 52T 68T | 1.3077/1 | 3.9231/1 | |
| | | | | |
| 3.0/1 | 54T 66T | 1.2222/1 | 3.6667/1 | |
| | | | | |
| 3.0/1 | 56T 64T | 1.1429/1 | 3.4286/1 | 7.25" SERIES COILS |
| | | | | |
| 3.0/1 | 58T 62T | 1.0690/1 | 3.2069/1 | |
| | | | | |
| 3.0/1 | 60T 60T | 1.0/1.0 | 3.0/1 | PRE J'SHAFT COILS |
| | | | | |
| 3.0/1 | 66T 54T | .818/1 | 2.4545/1 | VERY SMALL COILS |

APPARATUS FOR MANUFACTURING MATTRESSES AND BOX SPRINGS

TECHNICAL FIELD

This invention relates in general to the manufacture of mattresses and box springs, and particularly relates to the manufacture of springs for use in pocketed coil, or "Marshall" type constructions.

BACKGROUND OF THE INVENTION

In the prior art, it is known to form springs from wire, and to insert said springs into strings of pocketed or "Marshall" type coils. An example of such a construction is illustrated in U.S. Pat. Nos. 4,234,983 and 4,986,518 to Stumpf (hereinafter incorporated by reference). Methods and apparatuses for providing such constructions is disclosed in U.S. Pat. Nos. 4,439,977 and 4,854,023 to Stumpf (hereinafter incorporated by reference). Such elongate constructions, sometimes called pocketed coil strings, may then be assembled into an innerspring construction as disclosed in U.S. Pat. Nos. 4,566,926 and 4,578,934 to Stumpf (hereinafter incorporated by reference).

Although the above inventions provide effective, a need has been recognized for a method and apparatus for providing such innerspring constructions in a variety of sizes and coil heights to satisfy a buying public which has a recognized variety of mattress preferences. In order to minimize inventory expenses and to provide a truly "produced as needed" product, a need was recognized to provide a single manufacturing process which could be adapted to produce a variety of innerspring construction sizes. To achieve this goal, a need has also been recognized for a spring manufacturing apparatus which can manufacture springs having differing wire lengths, spring heights, and spring widths, with a minimum of changeover difficulties.

SUMMARY OF THE INVENTION

The present invention overcomes inadequacies in the prior an by providing an apparatus for manufacturing springs for an innerspring construction, which provides an optimization of spring size to production rate. This is accomplished in part by providing interchangable and matches change gears and spreader cams which correspond to a particular spring size.

Therefore, it is an object of the present invention to provide an improved mattress construction.

It is a further object of the present invention to provide an improved method for manufacturing mattresses.

It is a further object of the present invention to provide an improved apparatus for manufacturing mattresses which is cost-efficient to operate.

It is a further object of the present invention to provide an improved apparatus for manufacturing mattresses which is cost-efficient to maintain.

It is a further object of the present invention to provide an improved apparatus for manufacturing mattresses which is simple in operation.

It is a further object of the present invention to provide an improved apparatus for manufacturing mattresses which is readily compatible with other manufacturing devices.

It is a further object of the present invention to provide an improved apparatus for manufacturing mattresses which is reliable in operation.

It is a further object of the present invention to provide an improved apparatus for manufacturing mattresses which may be operated with a minimum of operator oversight.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the figures, where like numerals designate like objects throughout the several views.

GENERAL CONSTRUCTION AND OPERATION

Figure 1:
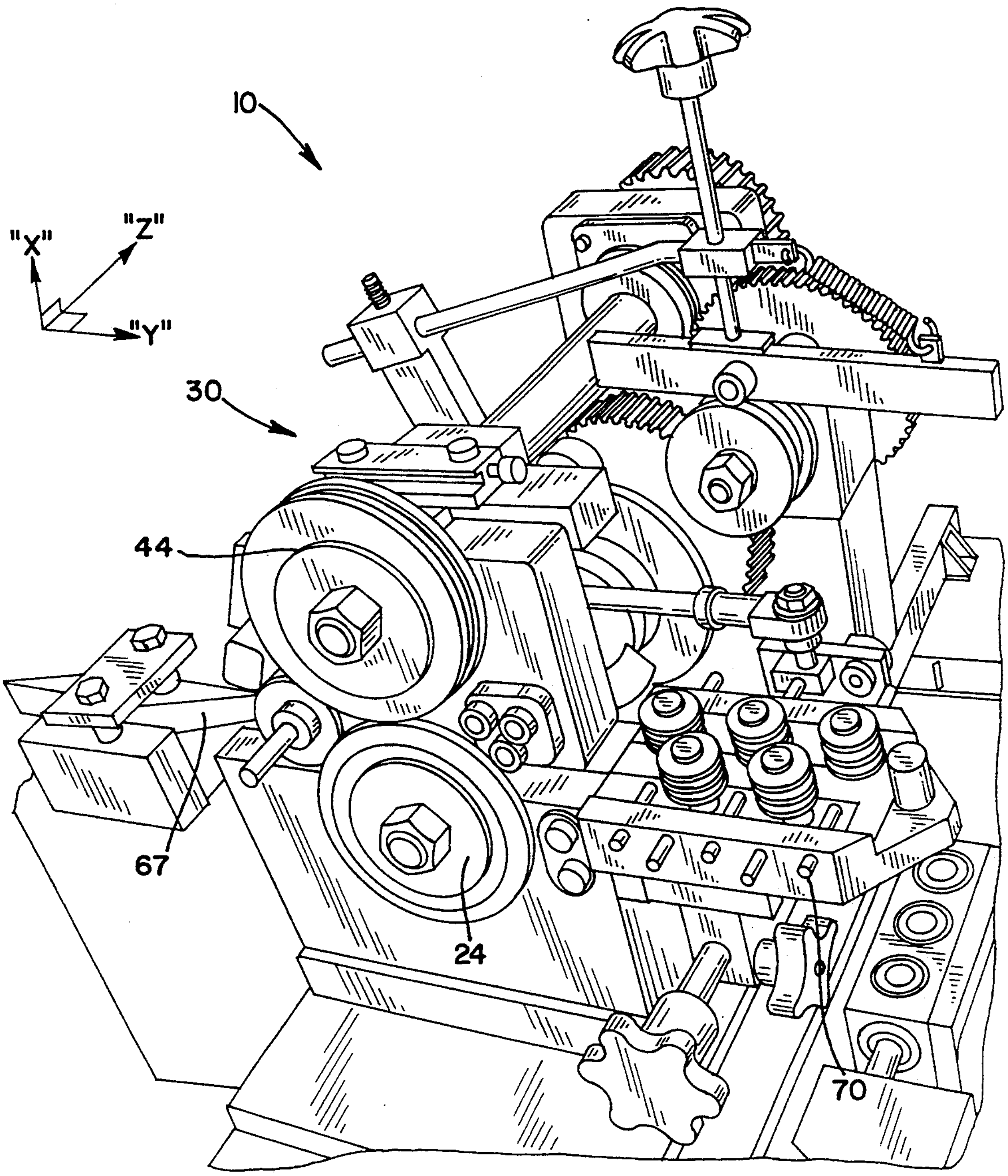
FIG. 1 is a pictorial view of a wire forming apparatus according to the present invention, facing the front left corner of the apparatus.
Figure 2:
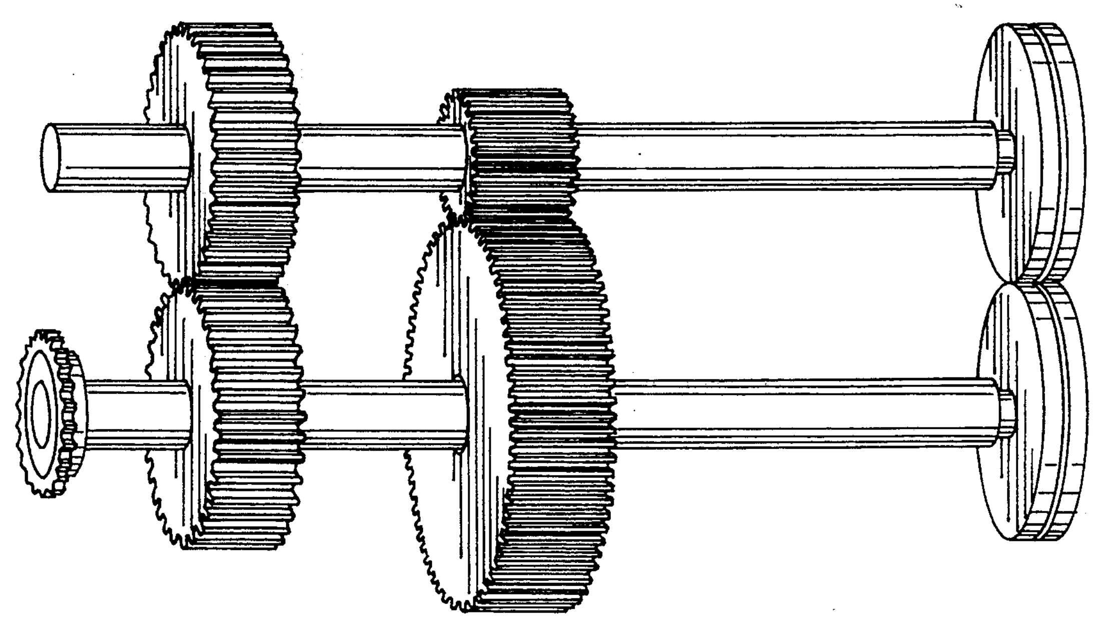
FIG. 2 PRIOR ART
FIG. 2 is an illustrative view of a prior art power transfer scheme.
Figure 3:
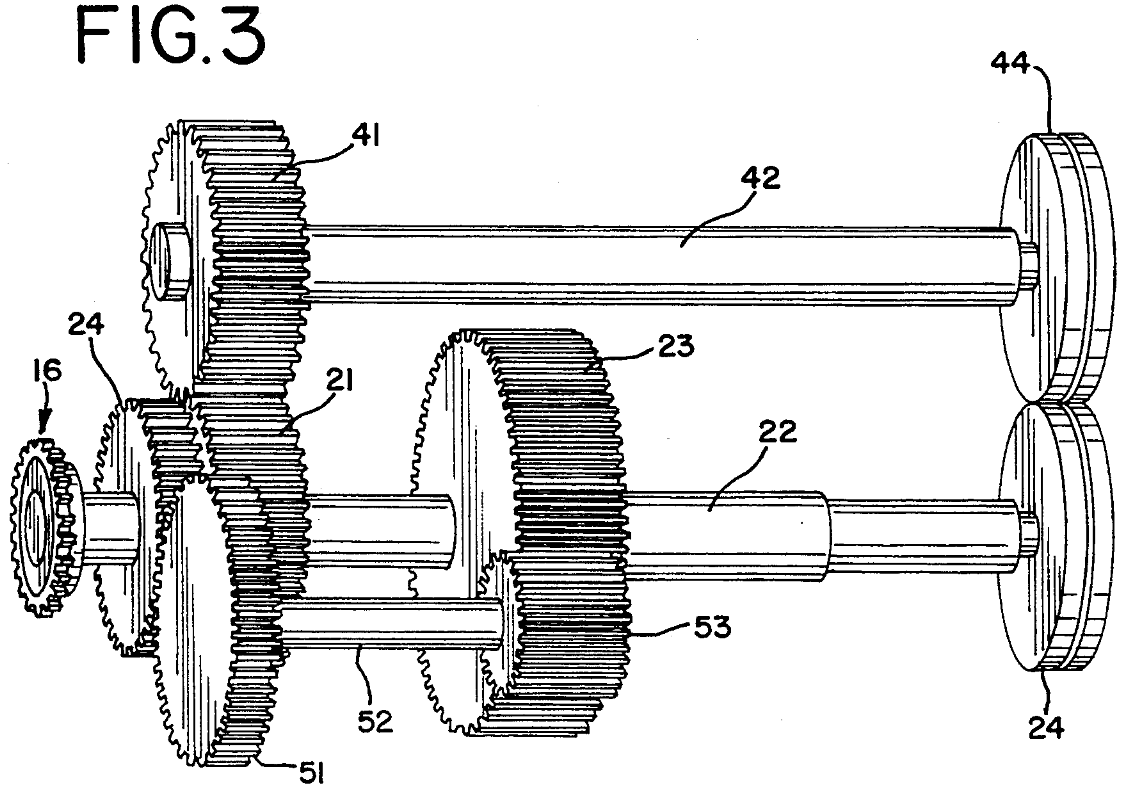
FIG. 3 is an illustrative view of a power transfer scheme according to the present invention.

General operation of the method and apparatus according to the present invention is now made. Referring now to FIG. 1, wire is pulled from a wire spool (not shown) and straightened by passing through a wire straightening station 70. The wire is fed by means of two cooperating upper and lower wire feed rolls 44, 24, respectively, which periodically combine to grip and feed the wire a selected distance. The wire is bent and cut to result in a finished wire spring such as that shown in FIGS. 10 and 11. Referring now to FIG. 3, change gears 24, 51, attached to a lower feed roll shaft 22, and a jackshaft 52, respectively, allow for adjustment or wire feed per each wire-forming cycle. This is to be distinguished from prior art system shown in FIG. 2.

Particular Construction and Operation

For purposes of this discussion, the spring forming apparatus 10 will be considered to have a "front", "rear", "left" and "right" sides, and is in relation to three mutually perpendicular axes, comprising axis "X", "Y", and "Z" (See FIG. 1). In operation the wire forming apparatus will it will be understood that, if an observer views the front of the apparatus, the operator will view the initial wire feed into the machine as going right-to-left and along the "Y" axis, with the springs formed thereon exiting along a path coming toward the observer and along the "Z" axis.

General Power Transmission

Figure 4:
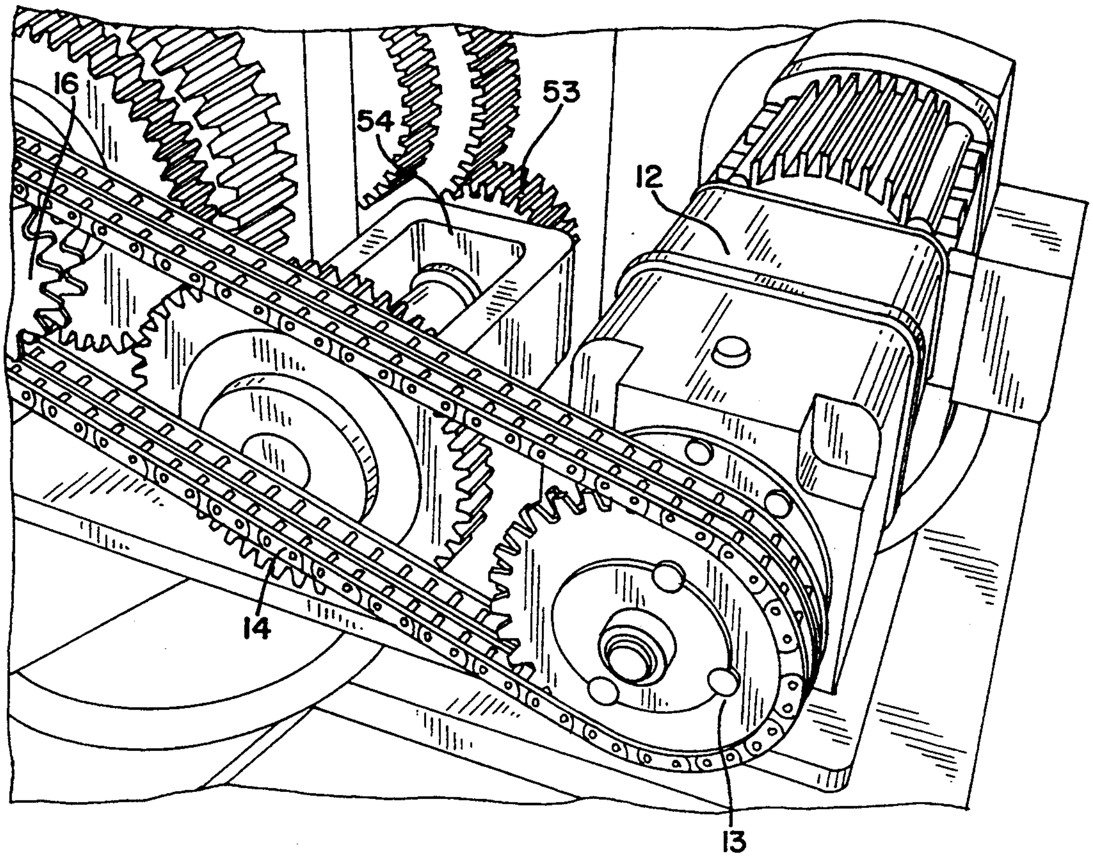
FIG. 4 is an isolated view of one portion of the apparatus of FIG. 1.

As illustrated particularly in FIGS. 3 and 4, power is supplied by an electric motor and gearbox assembly 12 or other power source. A chain 14 transfers power from a sprocket 13 mounted to the electric motor to a lower feed roll shaft sprocket 16 mounted approximate the end of a lower feed roll shaft 22, which is part of a lower feed roll shaft assembly 20. The lower feed roll shaft 22 is rotatably mounted relative to a frame 20 by bearings as known in the art, such that the lower feed roll shaft has a preferably stationary rotational axis relative to the frame 11 and substantially along the "Z" axis.

A change gear 24 is fixed approximate the rear end of the lower feed roll shaft 22. This gear 24 drives a change gear 51 fixed to the jackshaft 52. The jackshaft 52 is rotatably mounted to a jackshaft housing 55 by typical bearings and substantially along the "Z" axis. The jackshaft housing 54 is fixed to the frame 11.

A pinion gear 53 is fixed approximate the front end of the jackshaft 52. This pinion gear 53 drives a bull gear 23, which is rotatably mounted by a beating to the lower feed roll shaft 22. It is very important to the note that the bull gear 23 is not fixed to the lower feed roll shaft 22, but is allowed to rotate relative to the lower feed roll shaft 22.

As discussed in further detail below, the bull bear 23 acts as a type of timing device, in that the timing of the bull gear 23 determines the timing of wire feeding, spring formation, spring cutoff and the timing of other actions.

Upper Feed Roll Shaft Assembly

Figure 5:
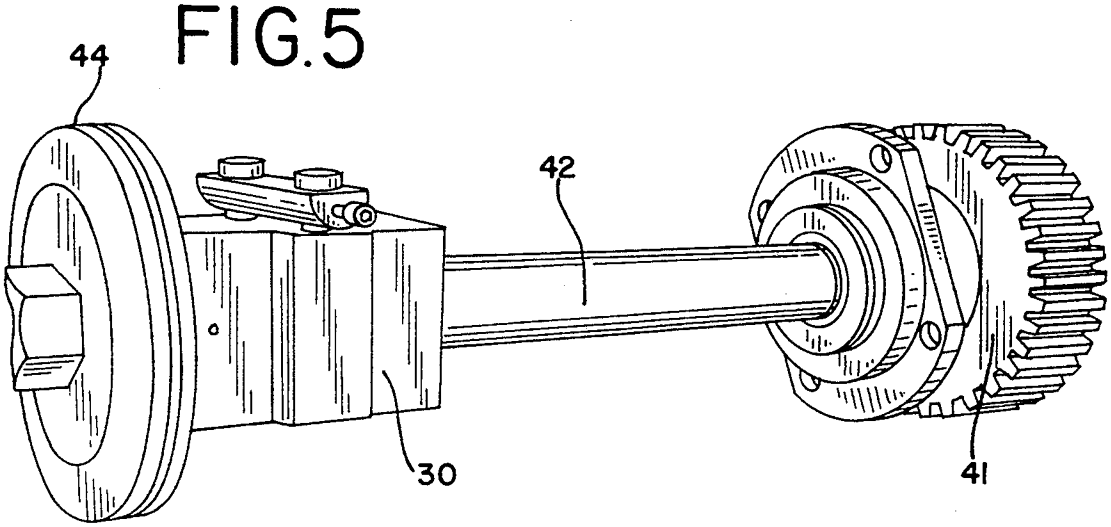
FIG. 5 is an isolated view of an upper wire feed roll assembly.
Figure 6:
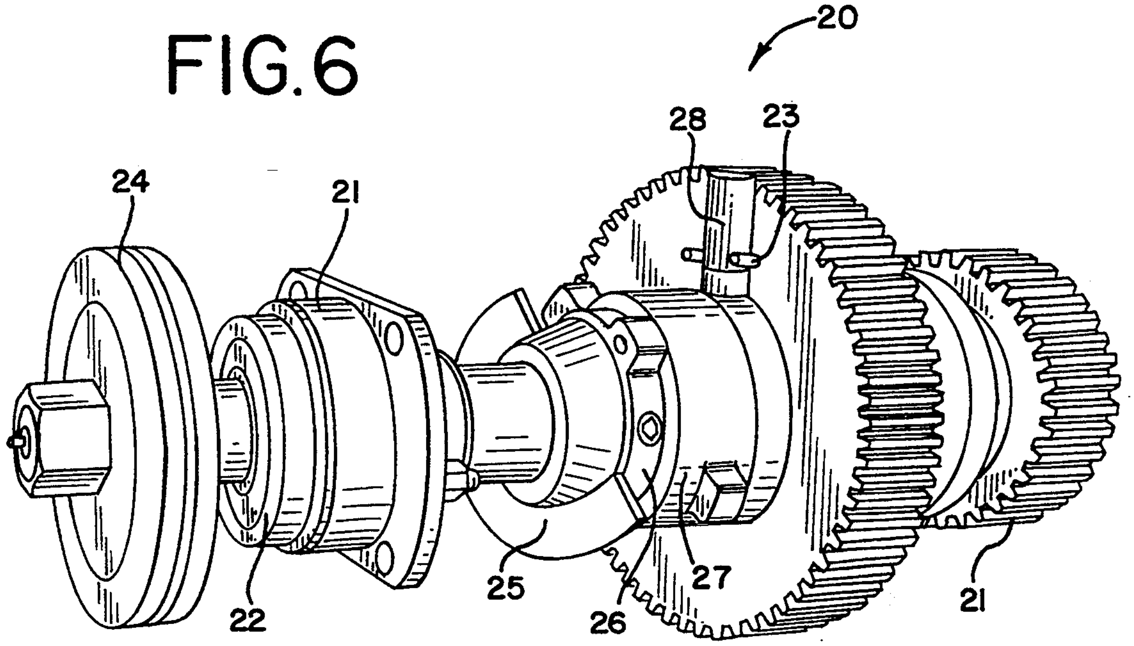
FIG. 6 is an isolated view of a lower wire feed roll assembly.

Referring now to FIGS. 3, 5 and 6, an upper feed roll shaft 42 is rotatably mounted relative to frame 11 by a pair of bearings which allow the shaft to pivot somewhat as discussed in detail later in this application. Power is transferred from the lower feed roll shaft 22 to the upper feed roll shaft 42 by means of interacting sprockets 21, 41, fixed approximate the rear end of the lower and upper feed roll shafts, 22, 42, respectively.

Approximate the front end of the upper feed roll shaft 42 is fixed an upper feed roll 44. As discussed in detail later in this application, the upper feed roll shaft 42 is periodically pivoted upwardly, causing the upper feed roll 44 to move upward and away from the lower feed roll 24, such that even though the two rolls are rotating, a gap therebetween prevents the two rolls from gripping the wire. However, when the upper feed roll shaft is in its "down" position, the feed rolls cooperate to grip or "pinch" the wire therebetween, to facilitate feeding of the wire for later forming and cutting.

Lower Feed Roll Shaft Assembly

Referring particularly to FIG. 6, the lower feed roll shaft assembly 20 includes a lower feed roll shaft 22, a wire feed roll 24 fixed to the lower feed roll shaft 22, a pair of bearings 21, a bull gear 23 having a bearing therein, a spreader cam 25 fixed relative to the bull gear 23, a fixed wire feed cam 26 fixed relative to the bull gear 23, a movable wire feed cam 27 adjustably fixed relative to the bull gear 23, a cutting knife driver 28 attached to the leading face of the bull gear 23, and a timing gear (not shown), attached adjacent the rear side of the bull gear. The timing gear drives a timing shaft 83 (See FIG. 14) which controls the timing of various pneumatically driven processes downstream of spring forming, including coil compression, coil insertion into fabric pocketing, pocket fabric feeding and pocket fabric sealing. Thus it may be seen that the timing of these pneumatic operations is dependent upon the speed of the bull gear.

The lower feed roll shaft 20 is rotatably mounted relative to the stationary frame 11.

Wire Feeding

The wire to be used in forming the spring is a typical spring wire. One type of wire is an upholstery wire having a property of 270,000–290,000 pounds per square inch tensile strength.

The Straightener

Figure 7:
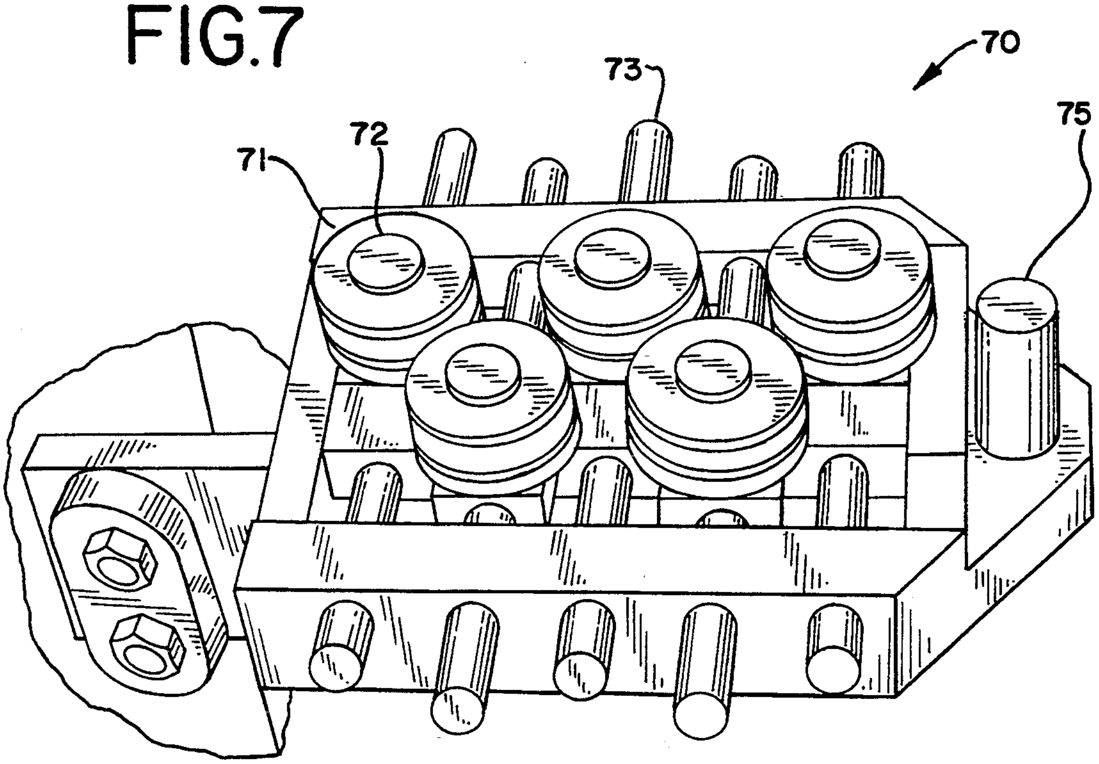
FIG. 7 is an isolated view of a wire straightening assembly.

Referring now to FIG. 7, a wire straightening assembly 70 is illustrated, which includes a wire straightening frame 71, and five straightener rollers 72. Each straightener roller 72 is mounted to a corresponding roller block 75 which may slide relative to the wire straightening frame 71. Adjustment and fixation of the corresponding roller blocks 75 to the wire straightening frame 71 is done by corresponding roller studs 73. As may be understood, the relative positioning of the straightener rollers 72 allows an operator to cause wire coming from a spool-type roll to be straightened prior to coiling an cutting.

The V-Grooved Rolls

Figure 8:
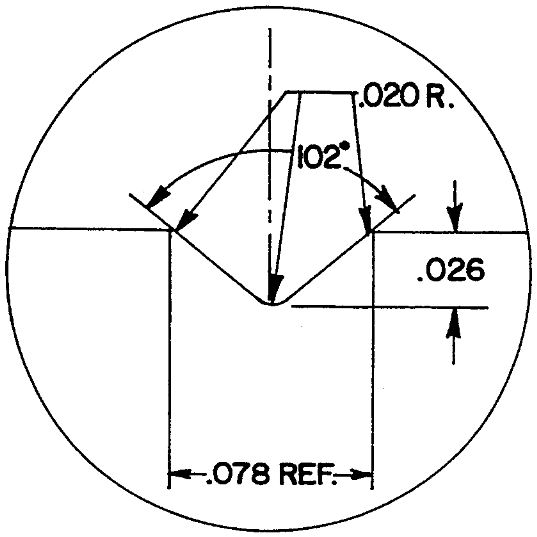
FIG. 8 is an isolated view of a cross sectional section of an upper or lower feed roll.
Figure 9:
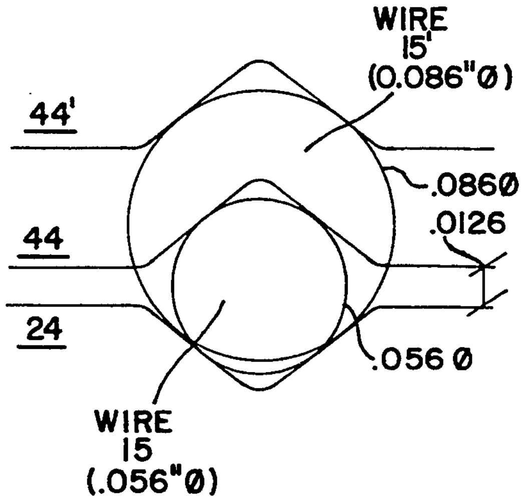
FIG. 9 is an isolated view of a cross sectional section of an upper and lower feed roll with wire therebetween.
Figure 12:
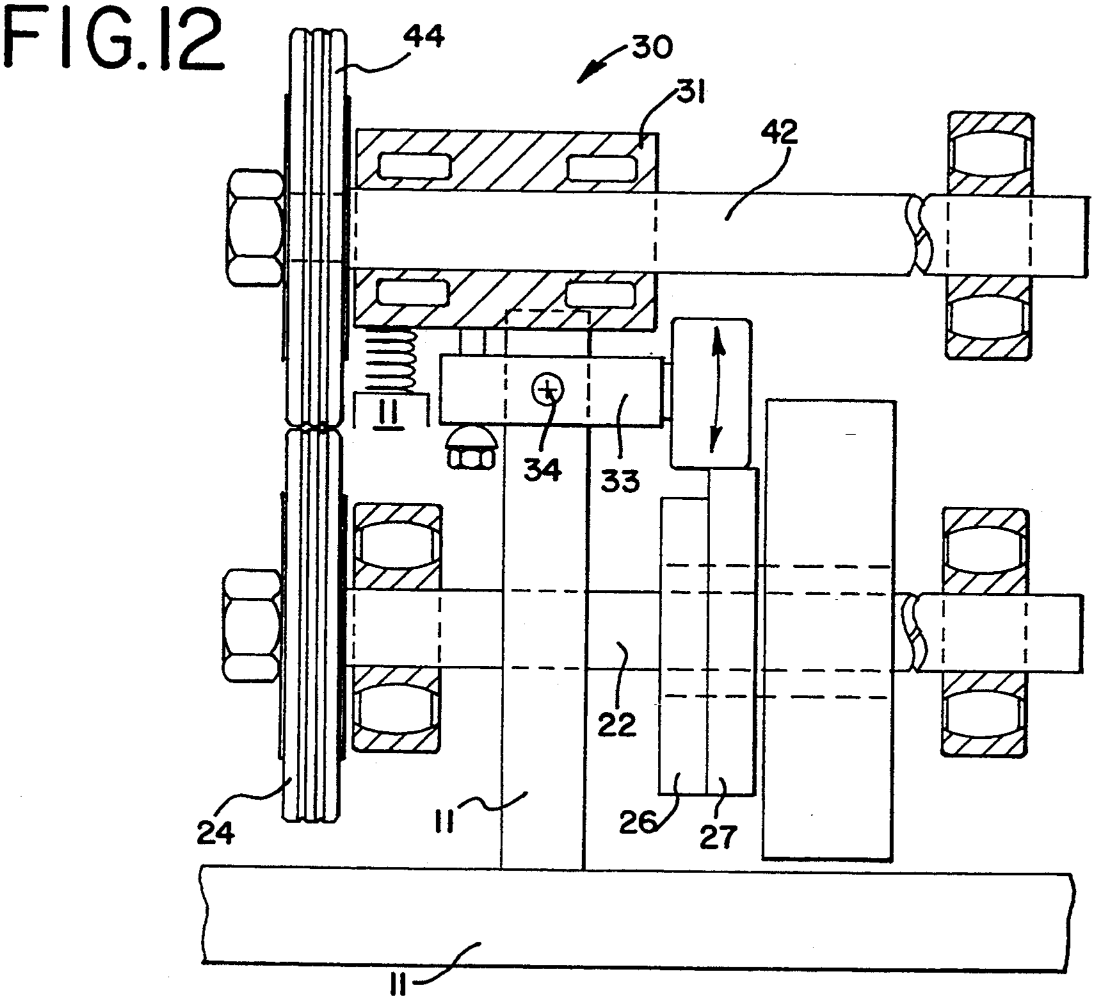
FIG. 12 is an illustrative view of the linkage between the bull gear and the sliding front bearing of the upper feed roll shaft.

As discussed above, the two wire feed rolls 24, 44 pinch the wire to feed it. As shown in FIG. 12, two V-shaped grooves are in each of the rolls 24, 44. Referring now to FIG. 8, the cross-sectional area of one of the grooves in each of the wire feed rolls is shown. As may be seen in light of FIG. 9, the V-shaped cross section of the trough allows different gauges of wire to be used. The two gauges shown in FIG. 9 are 0.086" and 0.056" in diameter. Two grooves are in each roller to allow either roll to be reversed if one groove wears out. Only one groove per roll is utilized during operation.

The Sliding Upper Front Bearing Assembly

Referring now to FIGS. 1 and 12, the upper front bearing assembly 30 functions to allow the front end of the upper front feed roll shaft 42 to be lifted, to allow the upper feed roll 44 to be lifted relative to the lower feed roll 24, to facilitate selective feeding of wire gripped therebetween.

The upper front bearing assembly 30 includes a slidable bearing block 31 into which is mounted a roller bearing. The bearing block 31 is slidably mounted relative to the frame 11 along an axis which is substantially vertical. The bearing block is spring loaded such that the block is biased into an "up" position, the position in which the wire is not gripped by the two feed rollers.

The bearing block 31 is periodically indexed into a "down" position, which facilitates periodic feeding of the wire via the two rollers. This indexing is initiated by a pair of wire feed cams 26, 27, which are fixed relative to the bull gear (not shown in FIG. 12) and are allowed to rotate with the bull gear 23 relative to the lower wire feed shaft 22. The pair of wire feed cams includes a fixed wire feed cam 26 and a movable wire feed cam 27. Both of these cams provide a rolling path for a single roller member 32, which is spring-biased against the cams and facilitates up-and-down movement of the roller member as discussed in later detail.

The roller member 32 is rotatably mounted along a substantially horizontal axis to the rear end of an elongate pivot arm 33. This pivot arm 33 is pivotably mounted relative to frame 11 along a substantially horizontal axis at pivot point 34. The front end of the elongate pivot arm 33 is attached to the upper front bearing block 31, such that downward movement of the roller member 32 translates into an upward movement of the bearing block 31 (as well as the upper feed roll).

The fixed and movable cams 26, 27, are substantially similar in shape. The function of the leading (fixed) cam 26 is to cause the cam follower 32 to move from an upper position (no wire feed) to a lower position (wire feed), which is done by allowing the cam follower to be ramped up to the high side of cam 26. The cam follower then is passed to the high side of cam 27, where it eventually is allowed to ramp down depending on the position of movable cam 27.

As may be seen, spherical beatings are used at the rear of the upper and lower feed roll shafts, and at the front of the lower feed roll shaft.

Wire Forming

General

Figure 13:
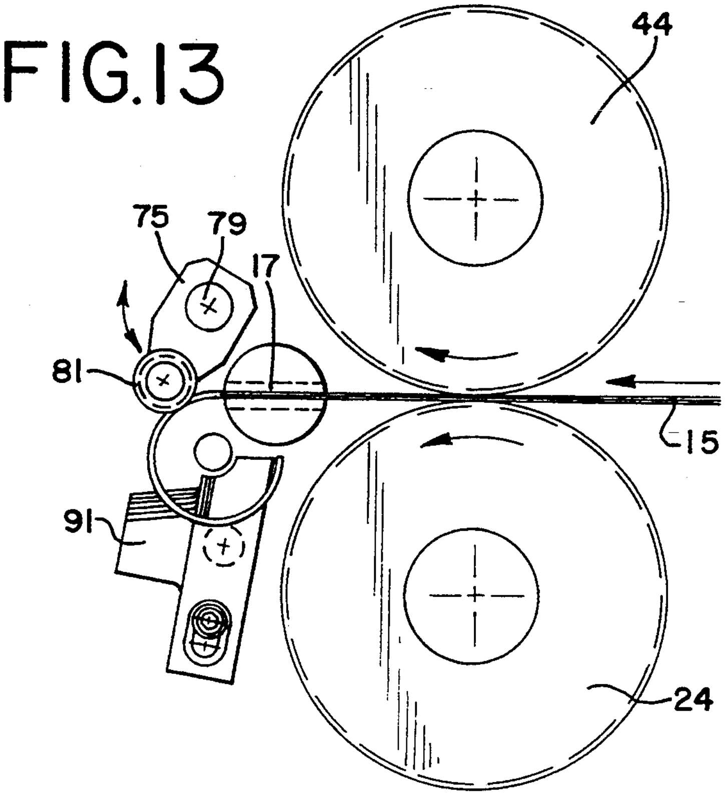
FIG. 13 is an illustrative view of the wire passing through the feed rolls and being bent into a spring.

Referring now to FIG. 13, the wire 15 is fed from the wire feed rolls 44, 24, through a fixed forming tube 17, which serves as a consistent positioning guide for the wire. The wire is then bent downwardly and into a curve by bending roller 81, also known as diameter roller 81. As discussed later in further detail, this action defines the "diameter" of the coil spring, which varies along its length.

After being bent by the diameter roller 81, the wire then passes along side a spreader cam 91, which as discussed in later detail is movable along a substantially horizontal axis along the "Z" direction. The more the spreader cam 91 is moved forwardly, the more the convolutions of the coil spring are spread. It may be understood that for a coil spring as shown in FIGS. 10 and 11, the spring convolutions are spread more in the center of the spring than at its ends.

The Coil Diameter Assembly 80

Figure 10:
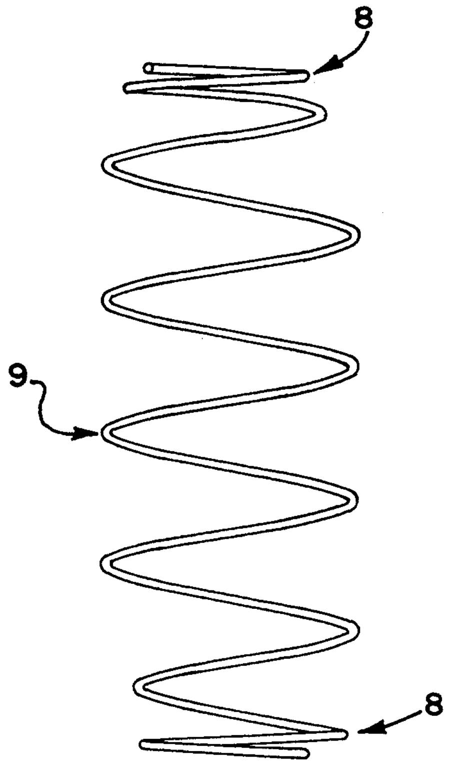
FIG. 10 is a pictorial view of a coil formed by the apparatus of FIG. 1.
Figure 11:
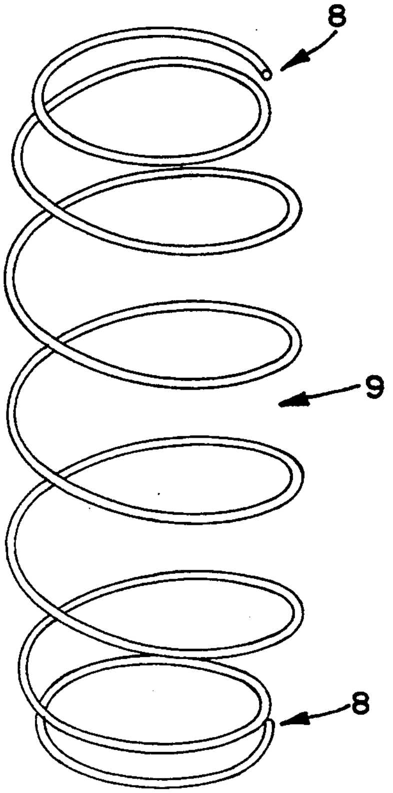
FIG. 11 is a side plan view of a coil formed by the apparatus of FIG. 1.

It may be understood that for the coils shown in FIGS. 10 and 11, the diameter of the coil at its center is greater than the diameter at its ends. For this purpose, varying amounts of the bending in this direction is provided. The coil diameter assembly 80 provides a bending action to the wire which determines the width (at the ends and at the middle) of the springs being manufactured.

Figure 14:
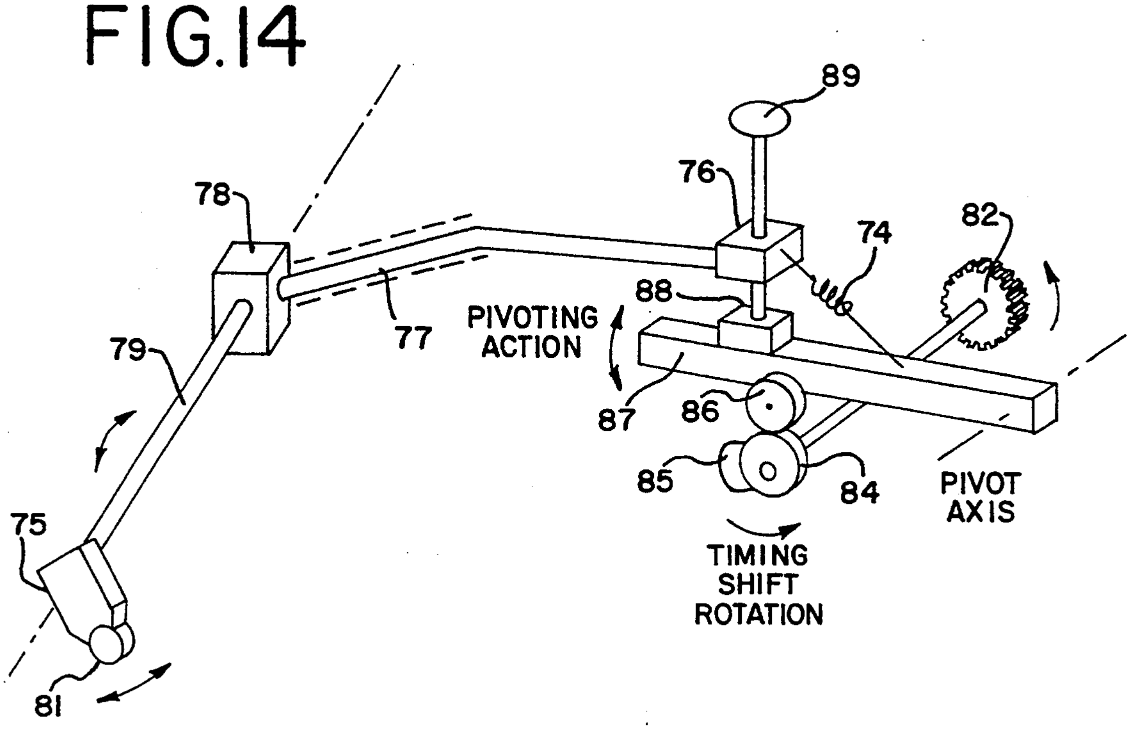
FIG. 14 is an isolated view of the linkage between the bull gear and the coil diameter roller.

Referring now also to FIG. 14, the construction and operation of the coil diameter assembly 80 is now discussed. Power and timing is obtained from a timing gear (not shown, attached to the rear of the bull gear) which drives the takeoff gear 82, which is fixed to the rear end of a timing shaft 83, which itself is rotatably mounted along the "Z" direction relative to frame 11 by bearings as known in the art.

A pair of cams 84, 85, are adjustably mounted relative to the timing shaft. These cams engage a cam follower 86, which is rotatably mounted relative to a pivoting bar 87 which is pivotably mounted relative to frame 11 along a substantially vertical "front-to-back" pivot axis parallel to the "Z" direction. As the cam follower 86 is moved up and down by the leading cam, the pivot bar 87 is also pivoted up and down.

The upper face of the pivot bar 87 includes a channel which slidably accepts a sliding bearing member 88, which itself accepts the lower end of an adjustment screw having a handle 89. A block 76 threadably accepts the adjustment screw approximate its middle, and this block 76 is fixed to a angled rod 77 which is fixed to a pivoting block 78 which is fixed approximately to the rear end of coil diameter shaft 79. Coil diameter shaft 72 is rotatably mounted along an axis along the "Z" direction by bearings (as known in the art) relative to frame 11.

A cam mounting member 75 is fixed to the front and of the coil diameter shaft 79. This member pivots along a substantially vertical axis along the "Z" direction to allow the coil diameter roller 81, rotatably attached thereto, to be moved into various bending positions between an "extreme in" position (more bending of the wire resulting in a lesser diameter) to an "extreme out" position (lesser bending of the wire resulting in a greater diameter). A spring 74 biases the roller towards the "extreme out" position.

The Coil Spreader Assembly

The coil spreader assembly 90 provides a varying bending action to the wire which assists and determining the length of a coil spring. Again in reference to FIGS. 10 and 11, it may be seen that it is often desirable to provide a coil spring which includes a full and complete revolution at the top and bottom ends 8 of the spring; this is especially desirable if the spring is to be placed upon a flat surface. However, in the middle 9 of the spring no overlap is desired, as such could cause the springs to bind or "hook". Therefore it may be understood that it is desirable to provide a variable bending action to the wire to case such a configuration.

Figure 15:
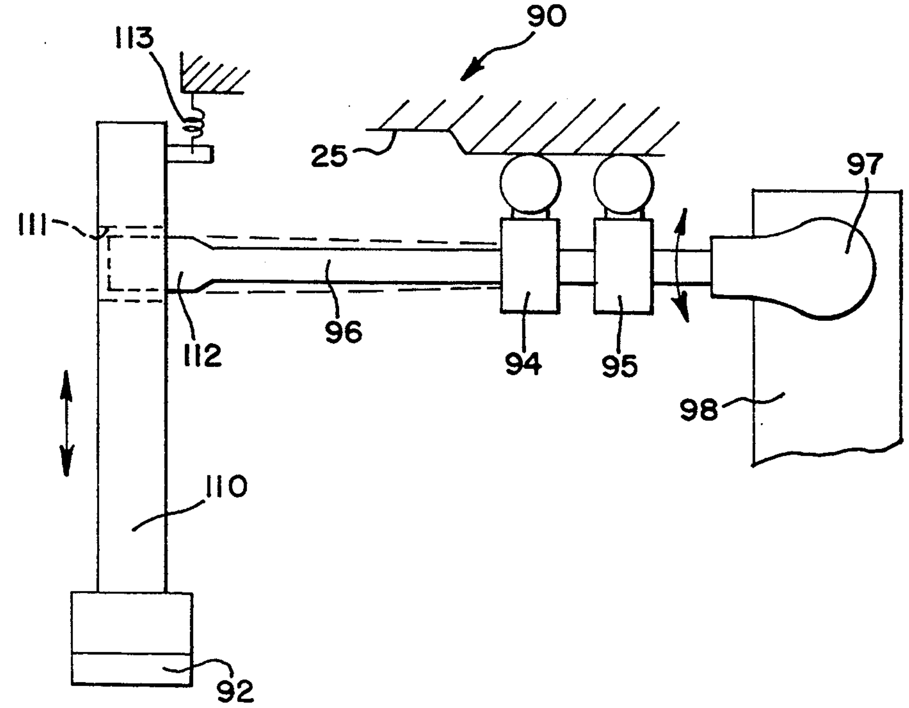
FIG. 15 is an isolated view of the linkage between the bull gear and the spreader bar.

Referring now to FIGS. 14 and 15, the movement of the spreader bar 92 along the "Z" direction is now discussed. As previously discussed, a replaceable spreader cam 25 is fixed relative to the bull gear, and is allowed to rotate with the bull gear relative to the lower feed roll shaft 22. As the spreader cam 91 rotates, it engages a pair of spreader cam followers 94, 95, each of which are adjustably attached to a medial portion of pivoting spreader linkage 96. As will be understood, as the cam followers are engaged and disengaged by the spreader cam 91, the spreader bar 91 is moved outwardly and inwardly, respectively, to cause a spreading action to be imparted upon the springs.

Referring now particularly to FIG. 15, the "right" end of the pivoting spreader linkage 96 is attached to a ball joint assembly 97, which is attached to a adjusting block 98 which is adjustable front-to-back, to allow the vertical pivot point of the pivoting spreader linkage to be moved forward or backward.

The "left" end 112 of the pivoting spreader linkage is reduced to a rectangular cross section, which fits within a transverse slot 11 extending through elongate spreader shaft 110. The shaft 110 is slidably mounted relative to the frame 11 by bushings (not shown), such that the shaft may slide along its longitudinal axis, which is along the "Z" direction. The spreader bar 92 is attached to the forward end of shaft 110 by means of a mount. Spreader shaft 110 is spring-biased into its retracted, rearmost position by a tensile spring 113.

As may be understood, as the spreader cam engages the two cam followers, the 96 tends to pivot relative to its right end, with the left end 112 causing the 110 to move forwardly along direction "Z" (by the pushing action of the cam 25) and rearwardly (by the tensile force or spring 113). This causes the spreader bar 92 to likewise be pushed forwardly (more spreading) and rearwardly (less or no spreading).

It should be understood that the use of two cam followers allows for a wider, adjustable "effective cam follower surface" which allows some adjustment of the cam following action by relative movement of the two cam followers 94, 95, relative to each other and along pivoting linkage 96, as in the preferred embodiment of the spreader cam 25 is not adjustable, although it is replaceable with a cam having a differing profile to match a particular pair of change gears. However, as discussed in later detail, the spreader cam is replaceable, as it may be necessary to change the spreader cam when the change gears are changed to provide a different cam profile corresponding to a different spring shape.

A shield 67 (shown in FIG. 1) is fixed in place relative to the frame to move the second convolution of wire out of the way of the spreader bar.

However, as discussed in later detail, the spreader cam is replaceable, and it may be necessary to change the spreader cam when the change gears are changed to provide a different spring shape.

Wire Cutting

Figures 16, 17:
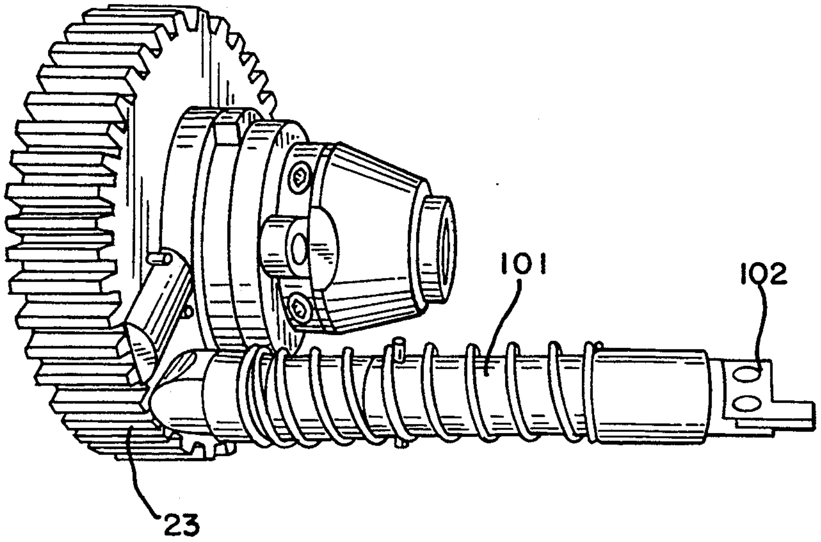
FIG. 16 is an isolated view of the linkage between the bull gear and the wire cutoff knife.
FIG. 17 is a chart illustrating various change gear ratios possible under the present invention.

Referring now to FIG. 16, the wire cutting process is now discussed. As previously discussed a cutting knife cam 28 is attached to the front face of the bull gear. The cutting knife cam 28 periodically contacts the rear end of a spring-loaded cut-off knife shaft 101, which causes a cut-off knife 102 to cut wire passing through the apparatus. After wire cutting, a spring biases the shaft back to its "retracted" position. The cut-off knife is replaceable.

Associated Devices

Figure 19:
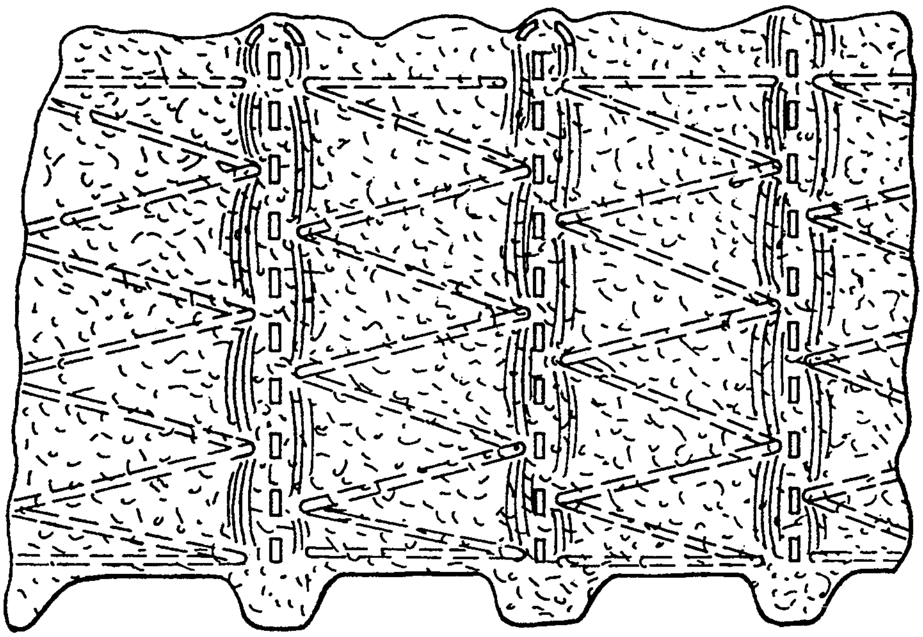
FIG. 19 is a view of pocketed coils.
Figure 20:
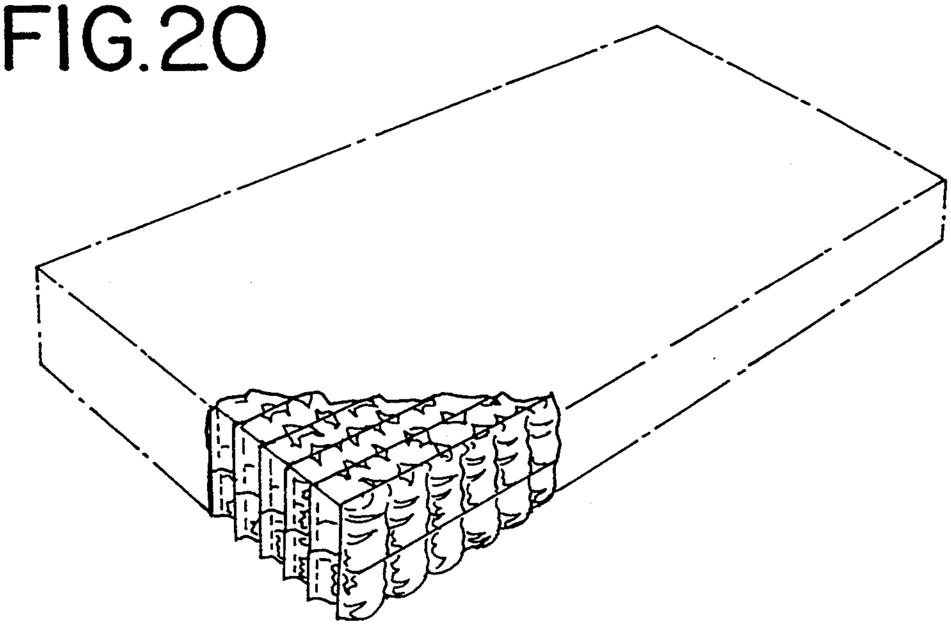
FIG. 20 is a view of an innerspring construction.
Figure 21:
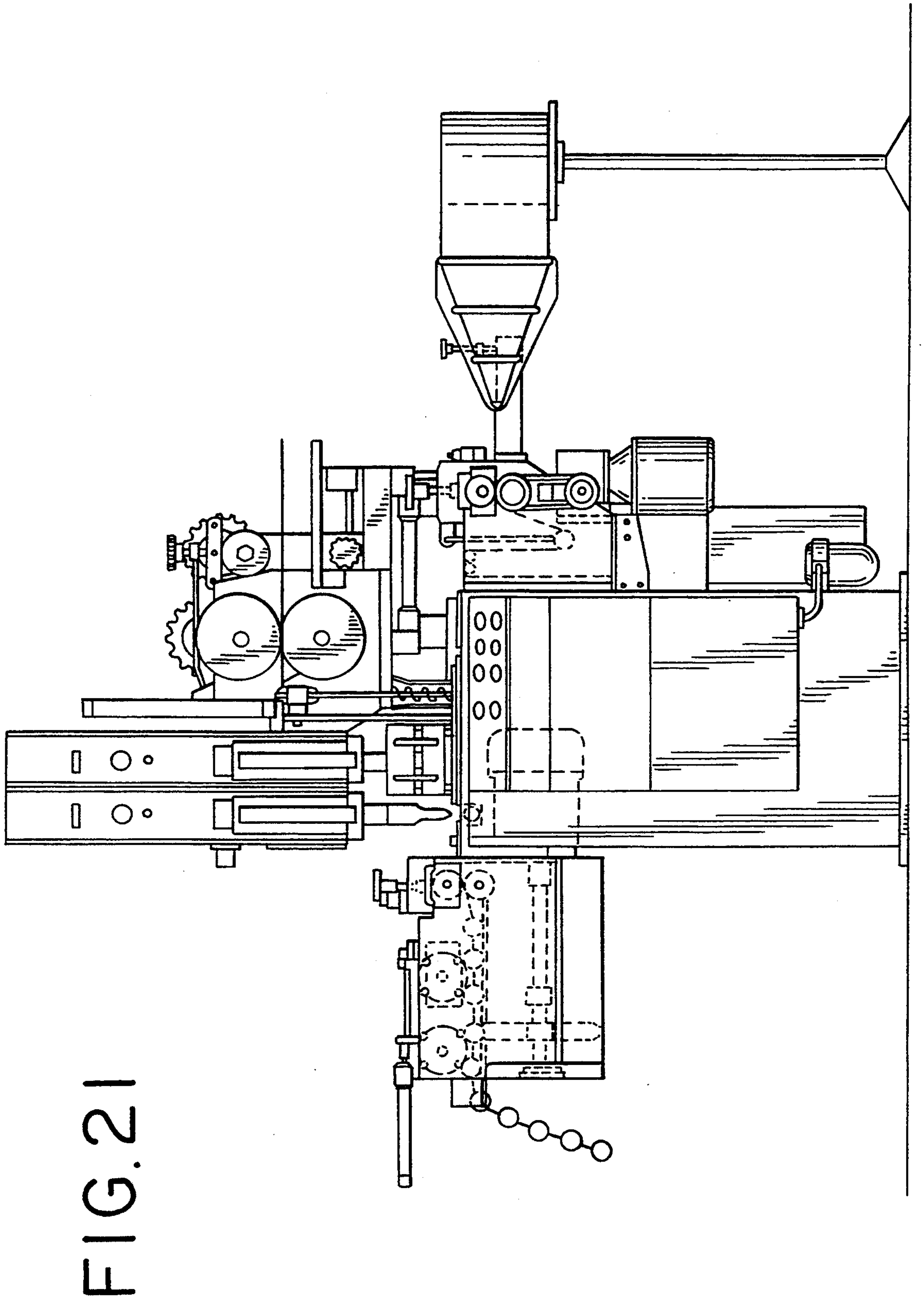
FIG. 21 is a view of a pocketed coil assembly machine.

Referring now to FIG. 21, a pocketing apparatus is shown, which accepts coils formed from the apparatus 10, and places the coil springs into pocketing material, such that a pocketed coil string is provided such as shown in FIGS. 19 or 20. The strings may be bonded together to form an innerspring construction as shown in FIG. 20. Such processes are disclosed in U.S. Pat. Nos. 4,234,983, 4,439,977, 4,566,926, 4,578,834, and 4,854,023, to Stumpf all hereinafter incorporated by references.

Timing

In the preferred embodiment, the timing shaft includes cams which engage corresponding switches. Each of these switches cause a specific type of action being part of the overall invention. In the preferred embodiment the switches open and close air valves to allow pressurized air to pneumatically drive or control these actions.

One action is the action of coil compression of the downstream coils. In order to insert the coils into fabric pockets, it is often necessary to compress them.

One action is the action of coil insertion of the compressed coils into the pockets.

One action is the action of thermally welding or otherwise providing coil pockets.

One action is the action of indexing the pocketing fabric after the coils have been inserted.

It may therefore by seen that the steps of coil compression, coil insertion, fabric welding, and fabric indexing are all timed in response to rotation of the timing shaft. Therefore it may also be understood that the use of the change gears allows for a change in wire feed for a given rate at which these steps occur. The relative timing of the various processes according to the invention is shown by the graphs shown in FIGS. 18a and 18b, discussed in detail later.

Change Gear Ratios and Spreader Gear Changing

As previously discussed, the change gears may be replaced in matching pairs. Each matching pair is accompanied by a particular associated spreader cam 25, which is replaced with the change gears.

Referring now to FIG. 17, the different ratios of the change gears which may be used is shown.

Column one, entitled "Base Ratio Pinion/Bull Gear", sets forth the rotational ratio between the pinion and the bull gear: three revolutions of the pinion gear per single revolution of the bull gear.

Column two, entitled "J'Shaft Gears, Driver-Driven", sets forth the number of teeth on the two change gears. For example, in the first line, the change gear on the lower feed roll shaft has 50 teeth, and the change gear on the jackshaft has 70 teeth. The ratio of lower feed roll shaft rotation to rotation of the bull gear (a cycle of operation of the spring forming apparatus) is 1.4/1.0, which is set forth in the next column entitled "J'Shaft Ratio". The "Total Ratio", set forth in the following column, is the ratio at which the lower feed roll shaft rotates relative to the bull gear. Again taking the first example, the bottom feed roll shaft rotates 4.2 times per single rotation of the bull gear.

This graph illustrates one important feature of the invention. By changing the change gears, the number of times the feed roll shafts rotate per cycle may be changed. One distinct advantage is that more wire may be fed per cycle, thus providing larger coils if needed. As discussed above, larger coils are at present in high consumer demand.

Figure 18A:
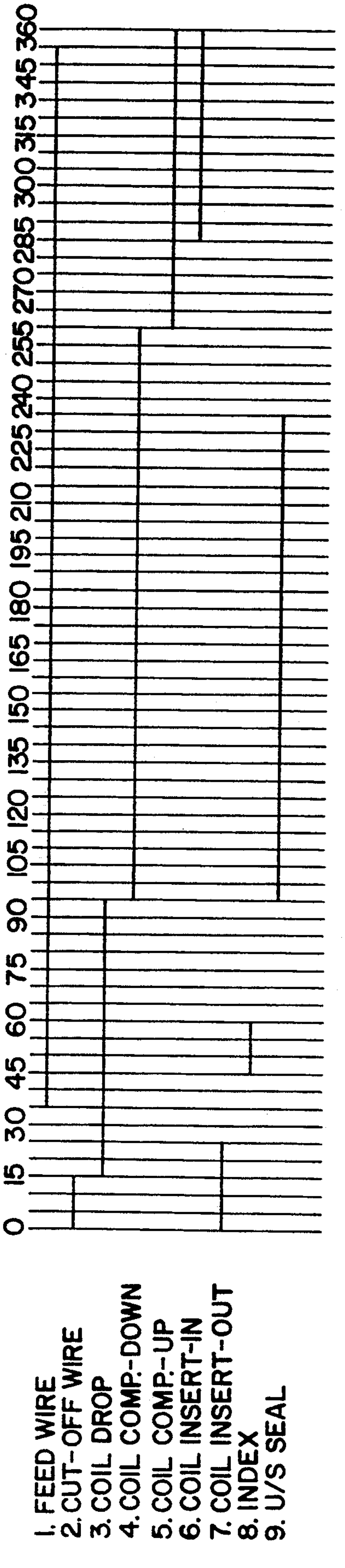
FIGS. 18A and 18B are a pair of charts illustrating differing processes varying due to use of different change gear ratios.
Figure 18B:
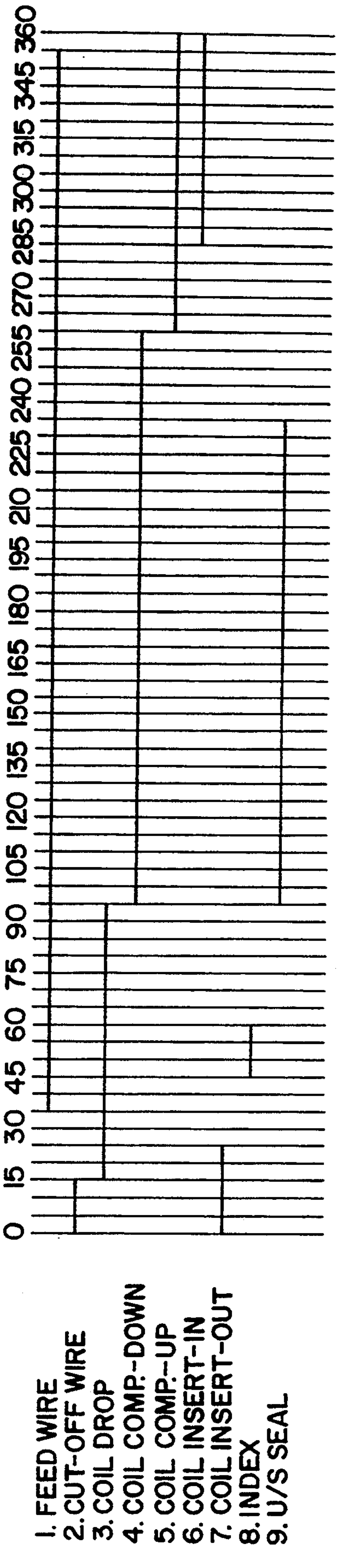

The advantage of providing additional wire feed is illustrated in reference to FIGS. 18*a* and 18*b*.

Explanation of the terms used in FIGS. 18*a* and 18*b* is as follows. "Feed Wire" is the process of feeding the wire to provide enough for a coil. As discussed above, this is dependent upon the speed of the lower wire feed shaft.

"Cut-Off Wire" is the process of cutting the wire to complete formation of a coil. The frequency of this is dependent upon the rotational speed of the bull gear, and occurs once per cycle.

"Coil Drop" is the process of dropping the coil from its cut-off position to its position atop of coil compression surface and beneath a coil compression head. The frequency of this is dependent upon the rotational speed of the bull gear, and occurs once per cycle.

"Coil Comp.-Down" is the process of urging the coil compression head downward. "Coil Comp.-Up" is the reverse of the above process. The frequency of this is dependent upon the rotational speed of the timing shaft (which is the same as that of the bull gear), and occurs once per cycle.

"Coil Insert-In" is the process of inserting a compressed coil within a pair of pocketing fabric plies by the use of an inserter head. The frequency of this is dependent upon the rotational speed of the timing shaft (which is the same as that of the bull gear), and occurs once per cycle.

"Coil Insert-Out" is the process of withdrawing the inserter head from the fabric plies. The frequency of this is dependent upon the rotational speed of the timing shaft (which is the same as that of the bull gear), and occurs once per cycle.

"Index" is the process of indexing the fabric one coil width at a time. The frequency of this is dependent upon the rotational speed of the timing shaft (which is the same as that of the bull gear), and occurs once per cycle.

"U/S Seal" is the process of welding the fabric to form at least part of a fabric pocket. The frequency of this is dependent upon the rotational speed of the timing shaft (which is the same as that of the bull gear), and occurs once per cycle.

As may be seen by a comparison of the two FIGS. 18A and 18B, the use of change gears and a forming cam allows the provision of a Total Ratio (see FIG. 17) of 3.42/1 instead of the previously "locked in" ratio of 3.00/1. Therefore, for a given cycle the feed time of the "feed wire" process may be shortened for a given amount of wire feed, as the wire may be fed at a greater rate for a given speed of the bull gear.

This in effect causes a "domino" effect, in that by adjusting such elements as 27, 84, 85, 94 and 95, the other processes may be given more time, which is desirable in that one of these processes is gravity-dependent, namely the Coil Drop process. It has been found that in many instances this process is the limiting process. Therefore if any time in the cycle may be "borrowed" from other processes (e.g., the Wire Feed cycle) the apparatus 10 may be run at an advantageously high rate, improving production rates. In effect, this allows for an optimization of spring size to production rate.

CONCLUSION

Therefore it may be seen that the present invention provides an improvement over the prior art by providing an apparatus for manufacturing springs for an innerspring construction, which provides an optimization of spring size to production rate.

It should be understood that although much of the discussion herein relates to springs for mattresses or box springs, it should be understood that the present invention may also related to springs used in other constructions, such as cushions.

While this invention has been described in specific detail with reference to the disclosed embodiments, it will be understood that many variations and modifications may be effected within the spirit and scope of the invention as described in the appended claims.

I claim:

1. An apparatus for forming springs from wire and inserting said springs into a mattress, comprising:

a) an inserting assembly for compressing coil springs, inserting said springs into pocketing fabric, and sealing said springs within said fabric to provide a pocketed coil string;

b) a coiler assembly for forming wire into coil springs, comprising:

a frame;

a lower feed roll shaft rotatably mounted relative to said frame;

a lower feed roll attached to said lower feed roll shaft;

an upper feed roll shaft rotatably and pivotably mounted relative to said frame;

an upper feed roll attached to said lower feed roll shaft, said upper feed roll positioned relative to said lower feed roll such that said upper and lower feed rolls are configured to grip wire between them when said upper and lower feed rolls are in a first relative position, and configured to release wire between them when said upper and lower feed rolls are moved from said first relative position to a second relative position;

means for rotating said lower and upper feed roll shafts such that wire is fed at a rate directly proportional to the rotation of said lower wire feed shaft when said upper and lower feed rolls are in said first relative position;

an upper shaft indexing assembly configured to allow said upper and lower shafts to be periodically brought together and separated, causing said upper and lower feed rolls to be correspondingly brought together to said first relative position and separated to said second relative position, to allow wire positioned between said feed rolls to be correspondingly gripped and released;

a first change gear removably attached to said lower feed roll shaft;

a jackshaft rotatably mounted relative to said frame;

a second change gear removably attached to said jackshaft;

a bull gear rotatably mounted relative to said frame;

a wire feed assembly for coordinating gripping and releasing of said wire by said upper and lower feed rolls to the rotation of said bull gear;

a wire cutting assembly for providing periodic cutting of said wire, said periodic cutting being synchronized to the rotation of said bull gear;

a wire diameter forming assembly for providing periodic diameter forming of said wire, said periodic diameter forming being synchronized to the rotation of said bull gear;

a wire spreader assembly for providing periodic spreading of said wire, said periodic spreading being synchronized to the rotation of said bull gear; and a timing shaft assembly including a timing shaft rotatably mounted relative to said frame and rotatably driven at a speed directly proportional to that of said bull gear, said timing shaft configured to provide timing signals to said string assembly, such that the steps of said coil compression, insertion, and sealing are all synchronized to said timing shaft, such that said change gears may be selected and replaced to allow the rate of wire feed to be correspondingly changed for a given rate of rotational speed of said bull gear.

2. The apparatus as claimed in claim 1, wherein said timing shaft assembly comprises a plurality of cams and triggers which cause signals associated with compressed air to initiate said compression, insertion, and sealing steps.

3. The apparatus as claimed in claim 1, wherein said timing shaft is driven at the same rotational speed as said bull gear.

4. The apparatus as claimed in claim 2, wherein said timing shaft is driven at the same rotational speed as said bull gear.

5. The apparatus as claimed in claim 1, wherein said upper and lower wire feed rolls each include an annular V-shaped slot having sides each having a substantially straight portion.

6. The apparatus as claimed in claim 4, wherein said upper and lower wire feed rolls each include an annular V-shaped slot having sides each having a substantially straight portion.

7. The apparatus as claimed in claim 1, wherein said bull gear is rotatably mounted upon said lower feed roll shaft.

8. The apparatus as claimed in claim 1, wherein said wire spreader assembly includes a replaceable spreader cam fixed relative to said bull gear, said spreader cam being capable of replaceable along with said change gears.

9. The apparatus as claimed in claim 1, wherein the ratio of teeth on said first change gear to the ratio of teeth on said second change gear is 50 to 70.

10. The apparatus as claimed in claim 1, wherein the ratio of teeth on said first change gear to the ratio of teeth on said second change gear is 55 to 65.

11. The apparatus as claimed in claim 1, wherein the ratio of teeth on said first change gear to the ratio of teeth on said second change gear is 52 to 68.

12. The apparatus as claimed in claim 1, wherein the ratio of teeth on said first change gear to the ratio of teeth on said second change gear is 54 to 66.

13. The apparatus as claimed in claim 1, wherein the ratio of teeth on said first change gear to the ratio of teeth on said second change gear is 56 to 62.

14. The apparatus as claimed in claim 1, wherein the ratio of teeth on said first change gear to the ratio of teeth on said second change gear is 66 to 54.

15. An apparatus for forming springs from wire, comprising:

a frame;

a lower feed roll shaft rotatably mounted relative to said frame;

a lower feed roll attached to said lower feed roll shaft;

an upper feed roll shaft rotatably and pivotably mounted relative to said frame;

an upper feed roll attached to said lower feed roll shaft, said upper feed roll positioned relative to said lower feed roll such that said upper and lower feed rolls are configured to grip wire between them when said upper and lower feed rolls are in a first relative position, and configured to release wire between them when said upper and lower feed rolls are moved from said first relative position to a second relative position;

means for rotating said lower and upper feed roll shafts such that wire is fed at a rate directly proportional to the rotation of said lower wire feed shaft when said upper and lower feed rolls are in said first relative position;

an upper shaft indexing assembly configured to allow said upper and lower shafts to be periodically brought together and separated, causing said upper and lower feed rolls to be correspondingly brought together to said first relative position and separated to said second relative position, to allow wire positioned between said feed rolls to be correspondingly gripped and released;

a first change gear removably attached to said lower feed roll shaft;

a jackshaft rotatably mounted relative to said frame;

a second change gear removably attached to said jackshaft;

a bull gear rotatably mounted relative to said frame;

a wire feed assembly for coordinating gripping and releasing of said wire by said upper and lower feed rolls to the rotation of said bull gear;

a wire cutting assembly for providing periodic cutting of said wire, said periodic cutting being synchronized to the rotation of said bull gear;

a wire diameter forming assembly for providing periodic diameter forming of said wire, said periodic diameter forming being synchronized to the rotation of said bull gear;

a wire spreader assembly for providing periodic spreading of said wire, said periodic spreading being synchronized to the rotation of said bull gear; and a timing shaft assembly including a timing shaft rotatably mounted relative to said frame and rotatably driven at a speed directly proportional to that of said bull gear, such that said change gears may be selected and replaced to allow the rate of wire feed to be correspondingly changed for a given rate of rotational speed of said bull gear.

16. The apparatus as claimed in claim 15, wherein the ratio of teeth on said first change gear to the ratio of teeth on said second change gear is 50 to 70.

17. The apparatus as claimed in claim 15, wherein the ratio of teeth on said first change gear to the ratio of teeth on said second change gear is 55 to 65.

18. The apparatus as claimed in claim 15, wherein the ratio of teeth on said first change gear to the ratio of teeth on said second change gear is 56 to 62.

19. The apparatus as claimed in claim 15, wherein the ratio of teeth on said first change gear to the ratio of teeth on said second change gear is 66 to 54.

* * * * *

UNITED STATES PATENT AND TRADEMARK OFFICE

CERTIFICATE OF CORRECTION

PATENT NO. : 5,444,905

DATED : August 29, 1995

INVENTOR(S) : Albert R. St. Clair

It is certified that error appears in the above-identified patent and that said Letters Patent is hereby corrected as shown below:

Column 10,
Line 3, delete “lower” and insert -- upper --

Column 11,
Line 36, delete “56” and insert -- 58 --
Line 49, delete “lower” and insert -- upper --

Signed and Sealed this

Twenty-fourth Day of June, 2003

JAMES E. ROGAN
*Director of the United States Patent and Trademark Office*